United States Patent
Huang et al.

(10) Patent No.: US 12,196,855 B2
(45) Date of Patent: Jan. 14, 2025

(54) DISTANCE DETECTION DEVICE

(71) Applicant: SZ DJI TECHNOLOGY CO., LTD., Shenzhen (CN)

(72) Inventors: Huai Huang, Shenzhen (CN); Jin Zhao, Shenzhen (CN); Xiaoping Hong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 887 days.

(21) Appl. No.: 17/216,365

(22) Filed: Mar. 29, 2021

(65) Prior Publication Data
US 2021/0215825 A1 Jul. 15, 2021

Related U.S. Application Data

(63) Continuation of application No. PCT/CN2018/109210, filed on Sep. 30, 2018.

(51) Int. Cl.
*G01S 17/42* (2006.01)
*G01S 7/481* (2006.01)
*G01S 7/4865* (2020.01)

(52) U.S. Cl.
CPC ............ *G01S 17/42* (2013.01); *G01S 7/4817* (2013.01); *G01S 7/4865* (2013.01)

(58) Field of Classification Search
None
See application file for complete search history.

(56) References Cited

U.S. PATENT DOCUMENTS

| | | | |
|---|---|---|---|
| 7,336,407 B1 | 2/2008 | Adams et al. | |
| 9,557,630 B1 | 1/2017 | Marason et al. | |
| 9,791,555 B2 | 10/2017 | Zhu et al. | |
| 2008/0278715 A1 | 11/2008 | Swenson et al. | |
| 2014/0078489 A1 | 3/2014 | Hoashi | |
| 2015/0185313 A1 | 7/2015 | Zhu | |
| 2016/0231560 A1 | 8/2016 | Hung et al. | |

FOREIGN PATENT DOCUMENTS

| | | |
|---|---|---|
| CN | 1849819 A | 10/2006 |
| CN | 101754085 A | 6/2010 |
| CN | 202143200 U | 2/2012 |

(Continued)

OTHER PUBLICATIONS

The World Intellectual Property Organization (WIPO) International Search Report for PCT/CN2018/109210 Jun. 28, 2019 6 Pages (including translation).

(Continued)

*Primary Examiner* — Hovhannes Baghdasaryan

(74) *Attorney, Agent, or Firm* — ANOVA LAW GROUP, PLLC

(57) ABSTRACT

The present disclosure provides a distance detection device. The distance detection device includes a light source configured to emit pulse light beams sequentially; and a scanning module including a first optical module, a second optical module, and drivers. The first optical module and the second optical module are sequentially positioned on an optical path of the light beams emitted by the light source, the drivers drive the first optical module and the second optical module to move to sequentially project the light beams emitted by the light source to different directions and form a strip-shaped scanning range after being emitted from the scanning module.

20 Claims, 10 Drawing Sheets

(56) References Cited

FOREIGN PATENT DOCUMENTS

| | | | |
|---|---|---|---|
| CN | 103576160 | A | 12/2014 |
| CN | 204362286 | U | 5/2015 |
| CN | 105824118 | A | 8/2016 |
| CN | 106526835 | A | 3/2017 |
| CN | 106802479 | A | 6/2017 |
| CN | 107024686 | A | 8/2017 |
| CN | 107037444 | A | 8/2017 |
| CN | 107422473 | A | 12/2017 |
| CN | 207623628 | U | 7/2018 |
| CN | 108387905 | A | 8/2018 |
| CN | 108490420 | A | 9/2018 |
| DE | 3217785 | C1 | 12/1983 |
| DE | 102015108422 | A1 | 12/2016 |
| EP | 1986032 | A1 | 10/2008 |
| JP | S63241519 | A | 10/1988 |
| JP | H05508573 | A | 3/1992 |
| JP | 2001091891 | A | 4/2001 |
| JP | 2005351853 | A | 12/2005 |
| JP | 2007170917 | A | 7/2007 |
| JP | 2007528027 | A | 10/2007 |
| JP | 2011011212 | A | 1/2011 |
| JP | 2013171125 | A | 9/2013 |
| JP | 2014079664 | A | 5/2014 |
| JP | 6395958 | B1 | 9/2018 |
| WO | 2007045638 | A1 | 4/2007 |

OTHER PUBLICATIONS

The World Intellectual Property Organization (WIPO) International Search Report for PCT/CN2018/109216 May 29, 2019 7 Pages (including translation).

The World Intellectual Property Organization (WIPO) International Search Report and Written Opinion for PCT/CN2019/071769 Jun. 11, 2019 9 Pages.

Michael Assel, et al., "Step scan method to enlarge the field of-view of focal plane array cameras by continuously rotating optical elements", Infrared Technology and Applications, vol. 5406, Aug. 30, 2004, p. 755-764.

Roy Gilles, et al., "Enhanced scanning agility using a double pair of Risley prisms", Applied Optics, vol. 54, No. 34, Dec. 1, 2015.

Church Philip, et al., "Evaluation of a steerable 3D laser scanner using a double Risley prism pair", Proc. SPIE 10197, Degraded Environments: Sensing, Processing, and Display 2017, May 5, 2017.

Philips Laou, et al., "A Phase 2 Scanner For Study of Optronics (W7701-135588/A) Presented to", Dec. 31, 2014 (Dec. 31, 2014), pp. 1-18.

DISTANCE DETECTION DEVICE

CROSS-REFERENCE TO RELATED APPLICATION

This application is a continuation of International Application No. PCT/CN2018/109210, filed on Sep. 30, 2018, the entire content of which is incorporated herein by reference.

TECHNICAL FIELD

The present disclosure relates to the field of optical detection and, more specifically, to a distance detection device.

BACKGROUND

Distance detection devices plays an important role in many fields. For example, distance detection devices can be used in mobile or non-mobile carriers for remote sensing, obstacle avoidance, surveying and mapping, modeling, etc. In particular, mobile carriers, such as robots, manually controlled aerial vehicles, unmanned aerial vehicles, unmanned vehicles, unmanned ships, etc., can navigate in complex environments by using distance detection devices to realize path planning, obstacle detection, obstacle avoidance, etc.

SUMMARY

The present disclosure provides a distance detection device. The distance detection device includes a light source configured to emit pulse light beams sequentially; and a scanning module including a first optical module, a second optical module, and drivers. The first optical module and the second optical module are sequentially positioned on an optical path of the light beams emitted by the light source, the drivers drive the first optical module and the second optical module to move to sequentially project the light beams emitted by the light source to different directions and form a strip-shaped scanning range after being emitted from the scanning module.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1:
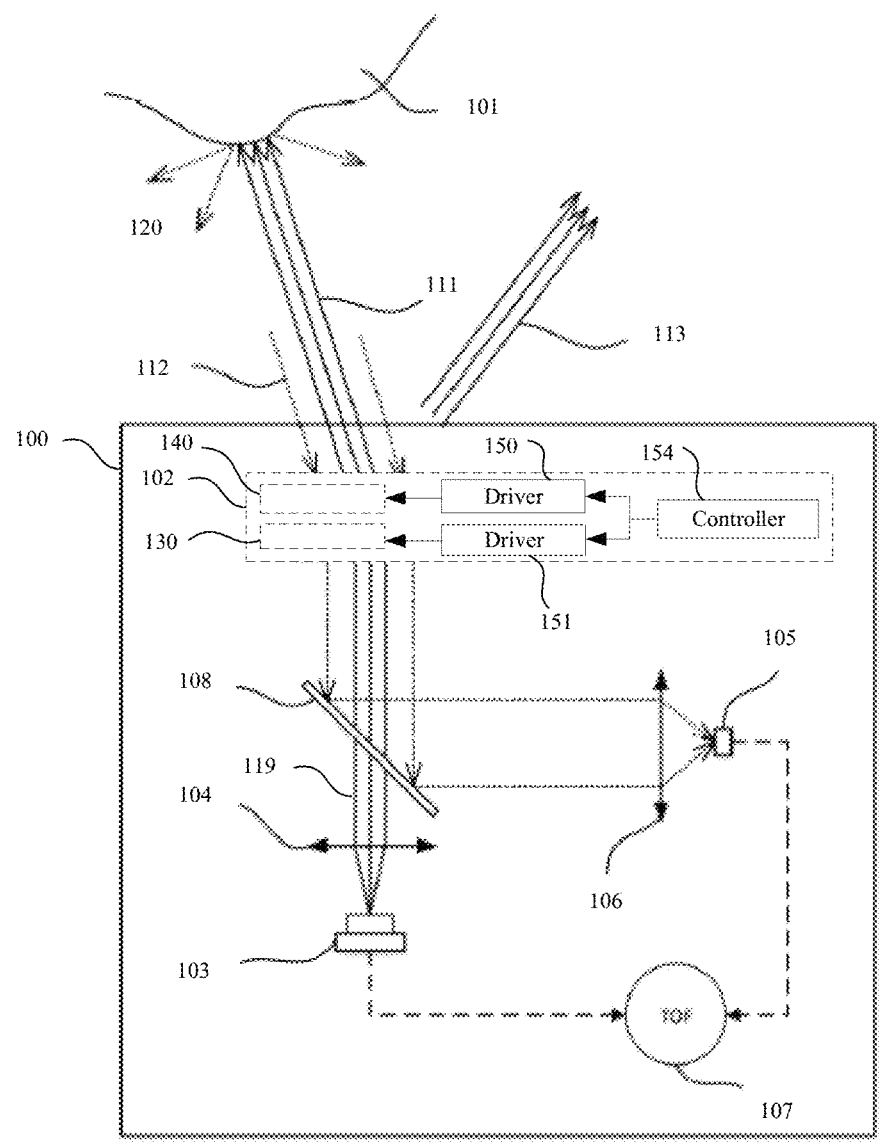
FIG. 1 is a schematic diagram of a distance detection device according to an embodiment of the present disclosure.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Here the illustrative embodiments will be described in detail, examples of which are shown in the accompanying drawings. In the following descriptions, when the accompanying drawings are involved, unless there are other express indication, the same numbers in different accompanying drawings indicate the same or similar elements. The implementation methods described in the following illustrative embodiments do not represent all implementation methods consistent with the present disclosure. Conversely, they are only examples of the device and method that are consistent with some aspects of the present disclosure that are described in the accompanying claims.

The technical terms used in the present disclosure are only for describing certain embodiments, and are not intended to limit the scope of the present disclosure. In addition, the singular forms "a," "said," and "the" are intended to include the plural forms as well, unless the context indicates otherwise. The term "and/or" used herein includes any suitable combination of one or more related items listed. Unless otherwise indicated, the terms "front," "rear," "lower portion," and/or "upper portion" and similar terms are only used for the convenience of description, and do not limit a position or location, or a space orientation. The terms "connect" or "connection" and other similar terms do not limit the connection to be physical or mechanical connections. The connection may also include electrical connection. The connection may be direct connection or indirect connection. The term "plurality" means at least two.

The distance detection device of the embodiments of the present disclosure may include a light source, a scanning module, and a detector. The light source can be used to emit light beams. The scanning module may include a first optical module, a second optical module, and a driver. The first optical module and the second optical module may be sequentially positioned on the optical path of the light beam emitted by the light source. The driver can drive the movement of the first optical module and the second optical module to sequentially project the light beam emitted by the light source to different directions, and form a strip-shaped scanning range after being emitted from the scanning module. The detector can be used to covert at least a part of the returned light reflected by a detection object into an electrical signal. The electrical signal can be used to measure the distance between the detection object and the distance detection device. By using the first optical module and the second optical module, a strip-shaped scanning range can be scanned to perform horizontal and vertical scanning, and the scanning range is wide.

The distance detection device 100 of the present disclosure will be described in detailed below with reference to the drawings. In the case of no conflict, the features of the following embodiments and examples can be combined with each other.

FIG. 1 is a schematic diagram of a distance detection device 100 according to an embodiment of the present disclosure. The distance detection device 100 can be used to measure the distance and orientation of a detection object 101 to the distance detection device 100. In one embodiment, the distance detection device 100 may include a radar, such as a lidar. The distance detection device 100 can measure the light propagation time between the distance detection device 100 and the detection object 101, that is, the Time-of-Flight (TOF) of light, to detect the distance between the detection object 101 ad the distance detection device 100.

The distance detection device 100 may include a light source 103, a scanning module 102, and a detector 105. The light source 103 can be used to emit light beams. In one embodiment, the light source 103 can emit a laser beam. The light beams emitted by the light source 103 may be a narrow-bandwidth beam with a wavelength outside the visible light range, for example, a laser with a wavelength of 905 nm. In some other embodiments, the light source 103 may emit light beams in other wavelength bands, such as millimeter waves, microwaves, ultrasonic waves, and infrared.

The scanning module 102 can be used to change the propagation direction of the light beam emitted by the light source 103 and project it to the space around the distance detection device 100. In some embodiments, the distance detection device 100 may also include a collimating lens 104. The collimating lens 104 may be disposed between the light source 103 and the light source 103 and used to collimate the light beam emitted by the light source 103 into a parallel light 119 (or close to a parallel light). The scanning module 102 can change the transmission direction of the parallel light 119 and project the parallel light 119 to the space around the distance detection device 100.

The scanning module 102 may include a first optical module 130, a second optical module 140, and drivers 150 and 151. The first optical module 130 and the second optical module 140 may be sequentially positioned on the optical path of the light beam emitted by the light source 103. The drivers 150 and 151 may be respectively used to drive the first optical module 130 and the second optical module 140 to move in order to project the light emitted by the light source 103 in different directions (for example, directions 111 and 113), and scan a strip-shaped scanning range, thereby scanning the space around the distance detection device 100. By using the first optical module and the second optical module, a strip-shaped scanning range can be scanned to perform horizontal and vertical scanning, and the scanning range is wide.

When the first optical module 130 moves, it may continuously change the direction of the light projected on it from the side close to the light source 103. When the incident direction of the light beam projected from the side close to the light source 103 to the first optical module 130 does not change, the first optical module 130 changing the exit direction of the light beam may include causing the emitted light beam scan back and forth along a straight line (or substantially along an arc), or causing a constant rotation scan, in which the angle between the light beam and a central axis of the first optical module may change or remain unchanged or change during the rotation.

When the second optical module 140 moves, it may continuously change the exit direction of the light beam projected on it from the side close to the light source 103. When the incident direction of the light beam projected from the side close to the light source 103 to the first optical module 130 does not change, the second optical module 140 changing the exit direction of the light beam may include causing the emitted light beam scan back and forth along a straight line (or substantially along an arc); or, causing the emitted light beam perform a constant rotation scan, in which the angle between the light beam and a central axis of the first optical module may change or remain unchanged or change during the rotation.

In some embodiments, the first optical module 130 may be close to the light source 103 relative to the second optical module 140. The incident direction of the light beam emitted by the light source 103 onto the first optical module 130 may be substantially unchanged. The following description takes the first optical module 130 being close to the light source 103 relative to the second optical module 140 as an example.

In some embodiments, when the first optical module 130 and the second optical module 140 change the light path of the light beam in such a way that the light beam scans back and forth or scans repeatedly along a straight line (or substantially a straight line, or along an arc), in the scanning module 102, the placement positions of the first optical module 130 and the second optical module 140 may be that the straight lines (or substantially straight lines or arcs)

corresponding to the two optical modules form a certain included angle. In some embodiments, the included angle may be greater than 20°, or greater than 40°, or greater than 60° or, greater than 80°. In this way, the scanning module 102 may change the light beam emitted by the light source 103, such that the light beam can scan a scanning range similar to a quadrilateral whose adjacent sides are not perpendicular.

In some embodiments, the included angle may be 90°, or close to 90°. In this way, when the incident direction of the light beam incident on the scanning module 102 from the side close to the light source 103 does not change, the scanning module 102 may change the light beam emitted by the light source 103, such that the light beam can scan a scanning range similar to a quadrilateral whose adjacent sides are perpendicular to each other.

In some embodiments, the straight line scanned by one of the first optical module 130 and the second optical module 140 may be longer than the straight line scanned by the other optical module, such that when the first optical module 130 and the second optical module 140 are combined to change the direction of the light beam of the light source 103, a scanning range similar to a strip may be scanned.

In some embodiments, one of the first optical module 130 and the second optical module 140 may scan along a straight line in the horizontal direction and the other optical module may scan along a straight line in the vertical direction, and the straight line in the horizontal direction may be longer than the straight line in the vertical direction. In this way, when the first optical module 130 and the second optical module 140 are combined to change the direction of the light beam of the light source 103, a strip-shaped scanning range extending in the horizontal direction may be scanned.

In other embodiments, when the incident direction of the light beam projected from the side close to the light source 103 to the first optical module 130 does not change, the light beam emitted by the first optical module 130 may scan a straight line. When the incident direction of the light beam projected from the side close to the light source 103 to the second optical module 140 does not change, the light beam emitted by the second optical module 140 may scan a circle. When the first optical module 130 and the second optical module 140 are combined, a circular strip-shaped scanning range may be scanned. The width of the strip scanning range may be the length of the straight line scanning by the first optical module 130.

In other embodiments, when the incident direction of the light beam projected from the side close to the light source 103 to the first optical module 130 does not change, the light beam emitted by the first optical module 130 may scan a straight line. When the incident direction of the light beam projected from the side close to the light source 103 to the second optical module 140 does not change, the light beam emitted by the second optical module 140 may scan an arc. When the first optical module 130 and the second optical module 140 are combined, an arc-shaped strip scanning range may be scanned. The width of the strip scanning range may be the length of the straight line scanning by the first optical module 130.

In other embodiments, when the incident direction of the light beam projected from the side close to the light source 103 to the first optical module 130 does not change, the light beam emitted by the first optical module 130 may scan a circle. When the incident direction of the light beam projected from the side close to the light source 103 to the second optical module 140 does not change, the light beam emitted by the second optical module 140 may scan a straight line. When the first optical module 130 and the second optical module 140 are combined, a long strip-shaped scanning range extending in multiple spirals may be scanned.

In other embodiments, when the incident direction of the light beam projected from the side close to the light source 103 to the first optical module 130 does not change, the light beam emitted by the first optical module 130 may scan a circle. When the incident direction of the light beam projected from the side close to the light source 103 to the second optical module 140 does not change, the light beam emitted by the second optical module 140 may scan a circle. When the first optical module 130 and the second optical module 140 are combined, a circular strip-shaped scanning range extending in multiple spirals may be scanned.

In other embodiments, when the incident direction of the light beam projected from the side close to the light source 103 to the first optical module 130 does not change, the light beam emitted by the first optical module 130 may scan a circle. When the incident direction of the light beam projected from the side close to the light source 103 to the second optical module 140 does not change, the light beam emitted by the second optical module 140 may scan an arc. When the first optical module 130 and the second optical module 140 are combined, an arced strip-shaped scanning range extending in multiple spirals may be scanned.

In other embodiments, when the incident direction of the light beam projected from the side close to the light source 103 to the first optical module 130 does not change, the light beam emitted by the first optical module 130 may scan an arc. When the incident direction of the light beam projected from the side close to the light source 103 to the second optical module 140 does not change, the light beam emitted by the second optical module 140 may scan a straight line. When the first optical module 130 and the second optical module 140 are combined, a long strip with arc-shaped scanning range may be scanned.

In other embodiments, when the incident direction of the light beam projected from the side close to the light source 103 to the first optical module 130 does not change, the light beam emitted by the first optical module 130 may scan an arc. When the incident direction of the light beam projected from the side close to the light source 103 to the second optical module 140 does not change, the light beam emitted by the second optical module 140 may scan a circle. When the first optical module 130 and the second optical module 140 are combined, a circular-shaped strip scanning range arranged in arc lines may be scanned.

In other embodiments, when the incident direction of the light beam projected from the side close to the light source 103 to the first optical module 130 does not change, the light beam emitted by the first optical module 130 may scan an arc. When the incident direction of the light beam projected from the side close to the light source 103 to the second optical module 140 does not change, the light beam emitted by the second optical module 140 may scan an arc. When the first optical module 130 and the second optical module 140 are combined, an arc-shaped strip scanning range arranged in arc lines may be scanned.

In other embodiments, when the incident directions of the light beams respectively incident on the first optical module and the second optical module do not change, the first optical module and the second optical module may also scan other shapes, respectively. When the first optical module 130 and the second optical module 140 are combined, a strip-shaped scanning ranges of other shapes may be scanned.

In other embodiments, the second optical module 140 may be close to the light source 103 relative to the first optical module 130. The incident direction of the light beam emitted by the light source 103 onto the second optical module 140 may be substantially unchanged. The combination of the second optical module 140 and the first optical module 130 may also scan various strip-shaped scanning ranges described above.

In some embodiments, the optical elements of the first optical module 130 and the second optical module 140 may be respectively driven by the respective drivers 150 and 151. FIG. 1 only illustrates two drivers 150 and 151, but it is not limited to this. The number of the drivers 150 and 151 may be the same as the number of moving optical elements of the first optical module 130 and the second optical module 140. Each driver may correspond to each moving optical element, and each driver may be used to drive the corresponding optical element to move. In some embodiments, there may be moving optical elements in each optical module, and the number of drivers may be the same as the number of drivers or optical modules and correspond to each other. Each driver may be used to drive at least a part of the optical elements in the corresponding optical module to move. In some embodiments, optical elements with the same movement may be driven by the same driver, and optical elements with different movements may be driven by different drivers. For example, in one embodiment, the movements of the first optical module 130 and the second optical module 140 may be different, and the drivers 150 and 151 may be respectively connected to the first optical module 130 and the second optical module 140. A controller 154 may control the drivers 150 and 151, thereby controlling the optical elements in the first optical module 130 and the optical elements in the second optical module 140 to move in different ways.

The drivers 150 and 151 may include at least one of a motor, a gear transmission assembly, and a belt transmission assembly. In some embodiments, the drivers 150 and 151 may include motors to drive the optical elements to rotate or vibrate. The controller 154 may control the rotation speed and/or rotation of the motors. The motor may include a hollow motor, and the optical elements may be disposed in the hollow motor and directly driven by the motor. In other embodiments, the drivers 150 and 151 may be driven by a gear transmission assembly and/or a toothed belt transmission assembly. The gear transmission assembly and/or the toothed belt transmission assembly may be connected with the motor to transmit the power of the motor to the optical element.

In some embodiments, the first optical module 130 may include at least one of a light-transmitting prism and a reflective element, and the second optical module 140 may include at least one of a light-transmitting prism and a reflective element. By using the moving light-transmitting prisms and/or the reflective elements to project light to different directions, a strip-shaped scanning range may be scanned, such that the cost is low and the scanning accuracy is high. The light-transmitting prism can refract the light beam and change the direction of the light beam. The reflective element can reflect the light beam. In some embodiments, the reflective element may include at least one of a reflective mirror, a reflective prism, a polygon mirror, and a galvanometer. The reflective prism, such as a 45° reflective prism, may have a reflective surface to reflect the light beam. The polygon mirror may include at least two reflective surfaces extending at an angle, such as a polygon mirror in which five reflective surfaces form a pentagon. In some embodiments, the polygon mirror may be a prism, and a reflective surface may be arranged on side of the prism. The galvanometer may include a MEMS (micro-electromechanical system) galvanometer.

In some embodiments, the scanning length of the strip-shaped scanning range in the horizontal direction may be greater than the scanning height of in the vertical direction, such that a larger range can be scanned in the horizontal direction. In some embodiments, the distance detection device 100 may be mounted on a vehicle and used for scanning the detection objects around the vehicle. The distance detection device 100 may be used in vehicles such as unmanned vehicles and mobile cars, and scan obstacles around the vehicle. The scanning length in the horizontal direction is long, which can scan a wider range of the vehicle in the horizontal direction. In some other embodiments, the distance detection device 100 may be mounted on an unmanned aerial vehicle or other equipment.

In some embodiments, the second optical module 140 may be positioned on the side of the first optical module 130 away from the light source 103. The light emitted by the light source 103 may pass through the first optical module 130, project to the second optical module 140, and project to the surrounding space of the distance detection device 100 through the second optical module 140. In other embodiments, the second optical module 140 may be positioned on the side of the first optical module 130 close to the light source 103. The light emitted by the light source 103 may pass through the second optical module 140, project to the first optical module 130, and project to the to the surrounding space of the distance detection device 100 through the first optical module 130.

In some embodiments, at least a part of the returned light reflected by the detection object 101 may sequentially pass through the optical modules 130 and 140 in the scanning module 102 and return to the distance detection device 100. The optical modules 130 and 140 may include the first optical module 130 and the second optical module 140. At least a part of the returned light passing through the scanning module 102 may be indecent on the detector 105 directly or through other optical elements. When the light 111 projected by the scanning module 102 hits the detection object 101, a part of the light may be reflected by the detection object 101 to the distance detection device 100 in a direction opposite to the projected light 111. The scanning module 102 may receive a part of the returned light 112 reflected by the detection object 101. A part of the returned light 120 reflected by the detection object 101 may not propagate to the scanning module 102 and may not be received by the scanning module 102.

The detector 105 may be used to convert at least a part of the returned light reflected by the detection object 101 into an electrical signal. The electrical signal may be used to measure the distance between the detection object 101 and the distance detection device 100. In the embodiment shown in FIG. 1, at least a part of the returned light passing through the scanning module 102 is converted into an electrical signal by the detector 105. In some embodiments, the detector 105 may include an avalanche photodiode. The avalanche photodiode is a highly sensitive semiconductor device that can convert an optical signal into an electrical signal by using the photocurrent effect.

In some embodiments, the detector 105 and the light source 103 may be positioned on the same side of the scanning module 102. In some embodiments, the distance detection device 100 may include a condensing lens 106, which may be positioned upstream of the detector 105 for converting the returned light to the detector 105. In one embodiment, the distance detection device 100 may include a reflective element 118. The reflective element 108 may be positioned between the collimating lens 104 and the scanning module 102, and between the scanning module 102 and the condensing lens 106. In one embodiment, the reflective element 108 may be used to reflect the returned light passing through the scanning module 102 to the condensing lens 106 and allow the light beam 119 collimated by the collimating lens 104 to pass through. In one embodiment, an opening or light-transmitting area corresponding to the positions of the light source 103 and the collimating lens 104 may be formed in the middle of the reflective element 108, and the collimated light beam 119 may pass through the opening or the light-transmitting area. In another embodiment, the positions of the light source 103 and the detector 105 shown in FIG. 1 may be reversed. In some embodiments, the reflective element 108 may include a reflective mirror or a reflective prism.

In one embodiment, the condensing lens 106 and the collimating lens 104 may be independent lens. In another embodiment, the condensing lens 106 and the collimating lens 104 may be the same lens, which may be positioned on the side of the reflective element 108 facing the scanning module 102. The lens may be used to collimate the light beam emitted by the light source 103, and converge the returned light passing through the scanning module 102 to the detector 105. In one embodiment, the condensing lens 106 and/or the collimating lens 104 may be coated with an anti-reflective coating to increase the intensity of the transmitted light beam.

In other embodiments, the detector 105 and the light source 103 may be positioned on opposite sides of the scanning module 102. The returned light reflected by the detection object 101 may be condensed to the detector 105 through the optical element outside the scanning module 102 and the condensing lens 106. The optical element, the condensing lens 106, and the detector 105 may be positioned on the same side of the scanning module 102.

In some embodiments, the distance detection device 100 may include a measuring circuit, such as a TOF unit 107, which can be used to measure the TOF to measure the distance of the detection object 101. For example, the TOF unit 107 may be used to calculate the distance through the formula of t=2Dcorresponding, where D represents the distance between the distance detection device and the detection object, c represents the speed of light, a t represents the total time it takes for light to project from the distance detection device 100 to the detection object 101 and returned from the detection object 101 to the distance detection device 100. The distance detection device 100 can determine the time t based on the time difference between the light emitted by the light source 103 and the return light received by the detector 105, and then determine the distance D. The distance detection device 100 can also detect the orientation of the detection object 101 relative to the distance detection device 100. The distance and orientation detected by the distance detection device 100 can be used for remote sensing, obstacle avoidance, surveying and mapping, modeling, navigation, and the like.

In some embodiments, the light source 103 may include a laser diode, and a nanosecond-level laser pulse sequence may be emitted through the laser diode. For example, the laser pulse emitted by the light source 103 may last 10 ns. Further, the laser pulse receiving time may be determined. For example, by detecting the rising edge time and/or falling edge time of the electrical signal pulse to determine the laser pulse receiving time. In some embodiments, a multi-stage amplification of the electrical signal may be performed. In this way, the distance detection device 100 may calculate the TOF by using the pulse receiving time information and the pulse sending time information, thereby determining the distance from the detection object 101 to the distance detection device 100.

In some embodiments, the distance detection device 100 may include a window (not shown) positioned outside the scanning module 102. The light projected by the scanning module 102 may be projected to the outside space through the window, and the returned light may pass through the window to the scanning module 102. The light source 103, the scanning module 102, the detector 105, the collimating lens 104, the condensing lens 106, and the reflective element 108 may be packaged in a packaging device, and the window may be formed in the packaging device. In one embodiment, the window may include a glass window. In one embodiment, a long-wave pass film may be plated on the window. In one embodiment, the long-wave pass film may have a low transmittance of visible light from about 400 nm to 700 nm, and a high transmittance to the light of the emitted light beam band.

In one embodiment, at least one of the inner surface of the window, the surface of the scanning module 102, the mirror of the detector 105, the surface of the collimating lens 104, the surface of the condensing lens 106, and the surface of the reflective element 108 may be coated with a positive water membrane. The positive water membrane may be a hydrophilic membrane. The oil volatilized when the distance detection device 100 heats up can be spread flat on the surface of the positive water membrane to prevent oil from forming oil droplets on the surface of the optical elements, thereby avoiding the influence of oil droplets on the light propagation. In some embodiments, the positive water membrane may be coated on the surface of other optical elements of the distance detection device 100.

Figure 2:
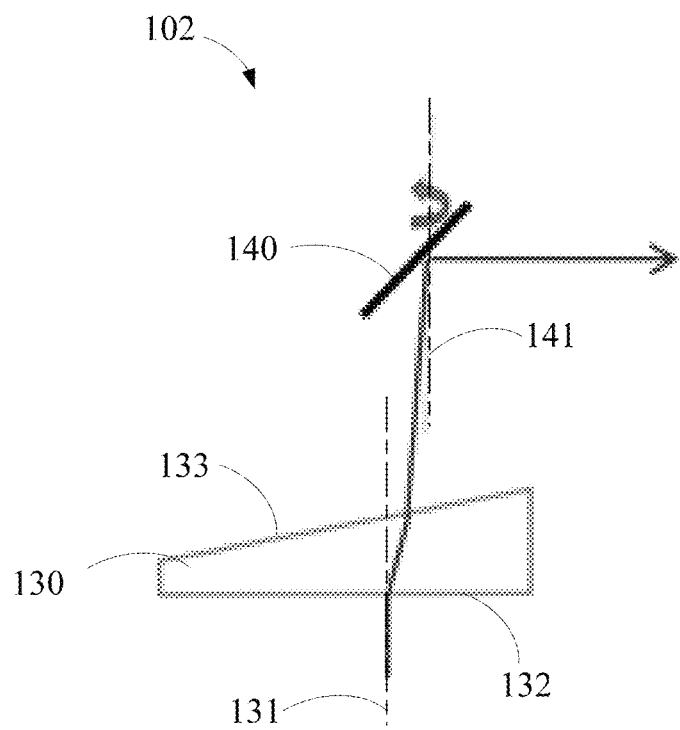
FIG. 2 is a schematic diagram illustrating a first optical module and a second optical module of a scanning module of the distance detection device shown in FIG. 1 according to an embodiment of the present disclosure.

In some embodiments, the first optical module 130 may be a light-transmitting prism, and the second optical module 140 may be a reflective element. FIG. 2 is a schematic diagram of an embodiment of the first optical module 130 and the second optical module 140 of the scanning module 102 shown in FIG. 1. In the embodiment shown in FIG. 2, the second optical module 140 is positioned on the side of the first optical module 130 away from the light source 103, and the reflective element 140 is positioned on the side of the light-transmitting prism 130 away from the light source 103.

The light-transmitting prism 130 may rotate around a rotation axis 131. In the embodiment shown in FIG. 2, thickness of the light-transmitting prism 130 may vary along the radial direction, such as a wedge-angle prism. In one embodiment, an incident surface 132 of the light-transmitting prism 130 receiving the light beam from the light source 103 may be perpendicular to the rotation axis 131, and the exit surface 133 relative to the incident surface 132 may be inclined relative to the incident surface 132, and inclined relative to the rotation axis 131. In other embodiments, the incident surface 132 may be inclined with respect to the rotation axis 131. The light beam emitted by the light source 103 may scan the FOV range through the 360° rotation of the light-transmitting prism 130. In another embodiment, the incident surface 132 of the light-transmitting prism 130 may be inclined to the rotation axis 131, and the exit surface 133 may be perpendicular to the rotation axis 131. In some other embodiments, the light-transmitting prism 130 may be a prism with other shapes, for example, a prism whose indecent surface and/or exit surface are curved.

In the embodiment shown in FIG. 2, the reflective element 140 may be a reflective mirror and a reflective prism. In one embodiment, the reflective element 140 may rotate around a rotation axis 141. The rotation axis 141 may be coaxial with the rotation axis 131 or a different axis. The rotation axis 141 and the rotation axis 131 may be parallel or formed at a certain angle, for example, at an angle of 90°. The reflective element 140 and the light-transmitting prism 130 may be driven by the same driver, or driven by different drivers. In one embodiment, the rotation speed of the reflective element 140 may be different from the rotation speed of the light-transmitting prism 130, and may be driven by different drivers. In one embodiment, the rotation speed of the reflective element 140 may be opposite to the rotation speed of the light-transmitting prism 130, such that the scanned point cloud is more uniform.

The reflective element 140 may include a reflective surface that reflects the light beam. The reflective surface may be inclined with respect to the rotation axis 141 of the reflective element 140 and face the first optical module 130. The reflective surface may be a plane such as shown in FIG. 2, or a curved surface, or it may be a reflective surface of a polygon mirror.

Figure 3:
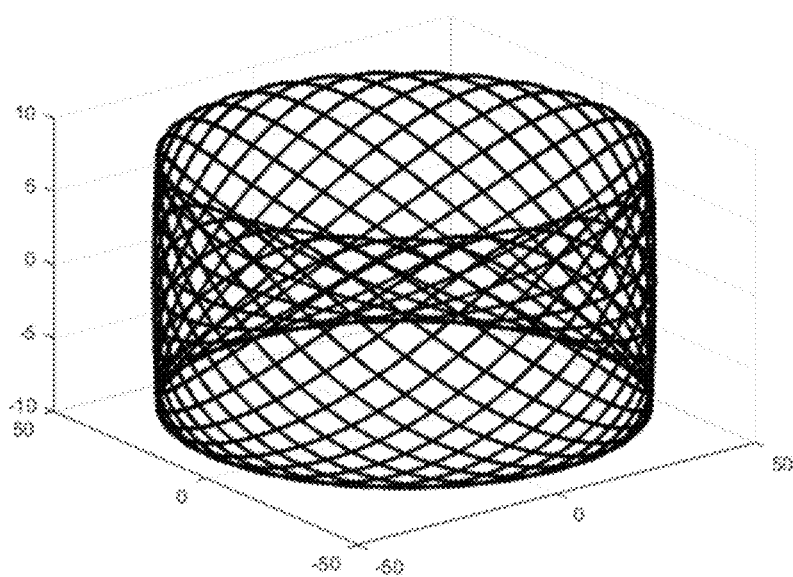
FIG. 3 is a schematic diagram of a scanning pattern scanned by the first optical module and the second optical module shown in FIG. 2.

In one embodiment, the reflective element 140 may rotate 360° around the rotation axis 141. In an embodiment where the reflective element 140 is a plane, when the incident direction of the light beam incident on the reflective element 140 does not change, the reflective element 140 may scan a circle. When the reflective element 140 and the light-transmitting prism 130 are combined, the light beam emitted from the light-transmitting prism 130 may be sequentially projected in different directions within a 360° circular area, and scanning the circular-shaped strip scanning range extending in multiple spirals. FIG. 3 is a scanning pattern scanned by this embodiment, which can scan a circle in the horizontal direction with a large scanning range. In order to see the scan pattern clearly, the scan pattern shown in FIG. 3 is relatively sparse. However, in actual scanning, a very dense scanning pattern may be realized by the rotation speed of the reflective element 140 and/or the light-transmitting prism 130 to ensure the accuracy of the distance detection. FIG. 3 is merely an example scanning pattern, and different patterns may be scanned by changing the rotation speed of the reflective element 140 and/or the light-transmitting prism 130. Similar to FIG. 3, the scanning pattern in the subsequent drawings are also relatively sparse, and are merely example scanning patterns.

In another embodiment, the reflective element 140 may continue to rotate around the rotation axis 141 within an angle less than 360°, or the reflective element 140 may rotate 360° around the rotation axis 141, and the reflective surface of the reflective element 140 may be set, such as a polygon mirror, to scan an arc-shaped strip scanning range less than 360°. For example, it may scan the horizontal arc-shaped scanning range within a certain angle range in the forward direction of the vehicle to detect obstacles in the forward direction of the vehicle.

Figure 4:
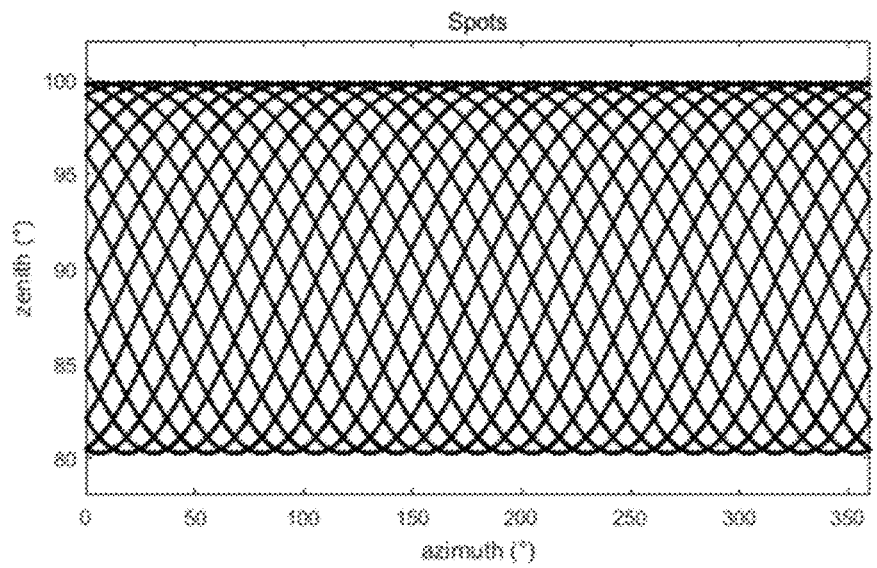
FIG. 4 is a schematic diagram of another scanning pattern scanned by the first optical module and the second optical module shown in FIG. 2.

In another embodiment, the reflective element 140 may vibrate. The angle of the reflective element 140 relative to the rotation axis 131 of the light-transmitting prism 130 may be sequentially changed, such that the scanning pattern shown in FIG. 4 may be scanned, and a substantially rectangular scanning range may be scanned.

Figure 5:
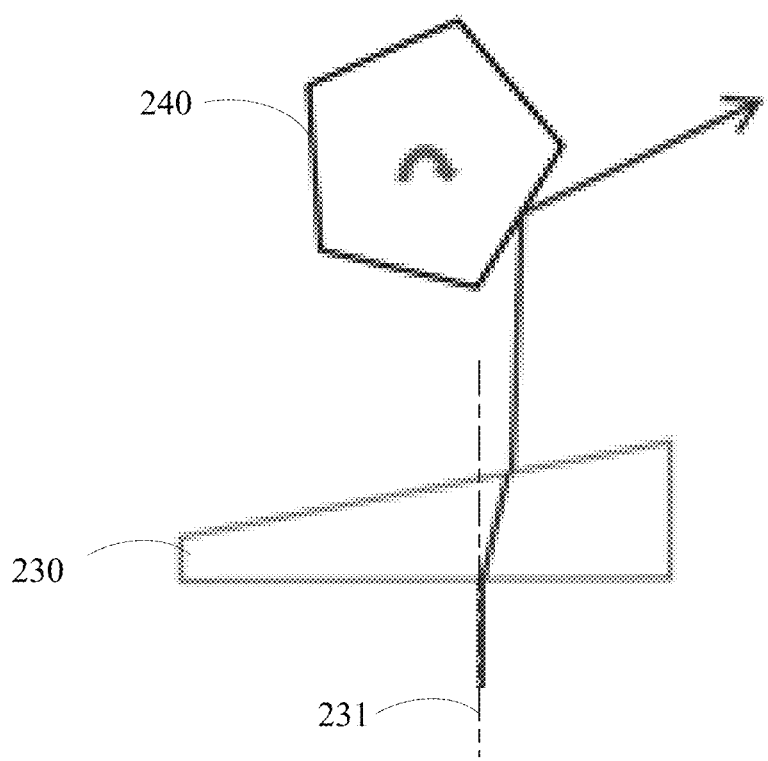
FIG. 5 is a schematic diagram illustrating the first optical module and the second optical module according to another embodiment of the present disclosure.

FIG. 5 is a schematic diagram illustrating a first optical module 230 and a second optical module 240 according to another embodiment of the present disclosure. The first optical module 230 may be a light-transmitting prism and the second optical module 240 may be a reflective element. The light-transmitting prism 230 shown in FIG. 5 is similar to the light-transmitting prism 130 shown in FIG. 2, and will not be repeated here.

In the embodiment shown in FIG. 5, the reflective element 240 is a polygon mirror, and the rotation axis of the polygon mirror 240 is perpendicular to a rotation axis 231 of the first optical module 230. In the illustrated embodiment, the rotation axis 231 of the light-transmitting prism 230 extends vertically in the paper plane, and the rotation axis of the polygon mirror 240 is perpendicular to the paper plane. A plurality of reflective surfaces of the polygon mirror 240 may be arranged around the rotation axis. The polygon mirror 240 may rotate in the direction of the arrow shown in FIG. 5, or in the opposite direction of the arrow. In another embodiment, the rotation axis of the polygon mirror 240 may be perpendicular to the rotation axis 231 of the light-transmitting prism 230 in the paper plane, or perpendicular to the rotation axis 231 of the paper plane in other planes. In another embodiment, the rotation axis of the polygon mirror 240 may be parallel to the rotation axis 231 of the light-transmitting prism 230, or may be coaxial with the rotation axis 231.

In the embodiment shown in FIG. 5, the polygon mirror 240 is positioned on the side of the light-transmitting prism 230 away from the light source 103. The polygon mirror 240 may be a prism, the rotation axis may be the central axis of the prism, and it may be perpendicular to the rotation axis 231 of the light-transmitting prism 230 in a plane perpendicular to the paper plane or other planes. The reflective surface of the polygon mirror 240 can alternately reflect the light beam emitted by the light-transmitting prism 230. When the incident direction of the light beam incident on the polygon mirror does not change, the polygon mirror 240 may scan an arc. The polygon mirror 240 may reflect the light beam emitted by the light-transmitting prism 230, and may scan an arc-shaped strip scanning range extending in multiple spirals. For example, in FIG. 5, the cross-section is a regular pentagonal polygon mirror 240, which scans a strip-shaped scanning range of a 72° angle range. The polygon mirror 240 is not limited to a polygon mirror with a regular pentagon in cross section, and may also be a polygon mirror with other shapes, such as a polygon mirror with a triangular cross section, a polygon mirror with a with a square cross section, and a polygon mirror with a with a hexagon cross section.

In another embodiment, the polygon mirror may be a prism pedestal, the smaller top surface of the prism pedestal may face the first optical module 230, and the side surface of the prism pedestal may be a reflective surface inclined toward the first optical module 230. The rotation axis of the polygon mirror may be parallel to the rotation axis 231 of the light-transmitting prism 230 or coaxial with the rotation axis 231. The rotation axis of the polygon mirror may be perpendicular to its top surface, or intersect with the top surface by less than 90°. When the incident direction of the light beam incident on the polygon mirror does not change, the polygon mirror may scan an arc. The polygon mirror may reflect the light beam emitted by the first optical module 230, and may scan an arc-shaped strip scanning range extending in multiple spirals.

Figure 6:
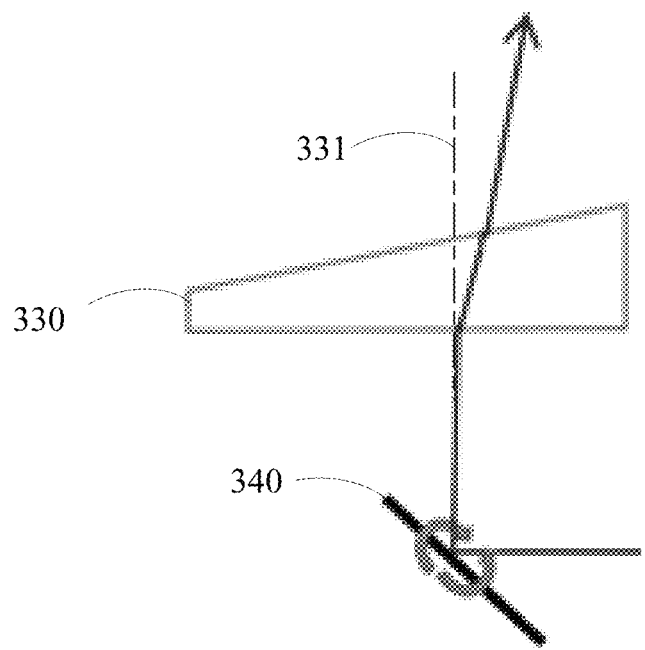
FIG. 6 is a schematic diagram illustrating the first optical module and the second optical module according to another embodiment of the present disclosure.

FIG. 6 is a schematic diagram illustrating a first optical module 330 and a second optical module 340 according to another embodiment of the present disclosure. The first optical module 330 may be a light-transmitting prism and the second optical module 340 may be a reflective element. In the embodiment shown in FIG. 6, the second optical module 340 is positioned on the side of the first optical module 330 close to the light source 103, and the reflective element 340 is positioned on the side of the light-transmitting prism 330 close to the light source 103.

Figure 7:
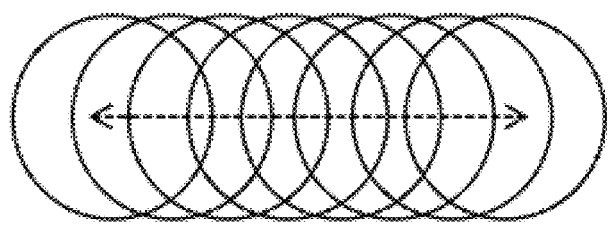
FIG. 7 is schematic diagram of a scanning range scanned by the first optical module and the second optical module shown in FIG. 6.

In the embodiment shown in FIG. 6, the reflective element 340 is a galvanometer, such as a MEMS galvanometer, and the reflective surface of the galvanometer 340 faces the first optical module 330. In one embodiment, the galvanometer 340 may vibrate left and right within the paper plane, and vibrate in the direction of the arrow in FIG. 6. In another embodiment, the galvanometer 340 may vibrate in a plane perpendicular to the paper plane. The galvanometer 340 may reflect the light beam emitted by the light source 103 and scan a straight line. The light beam reflected by the galvanometer 340 may be projected to the light-transmitting prism 330, and the light-transmitting prism 330 may rotate around a rotation axis 331 to scan a long strip-shaped scanning range extending in multiple spirals, such as the strip-shaped scanning range shown in FIG. 7. The shape and arrangement of the light-transmitting prism 330 shown in FIG. 6 are similar to the light-transmitting prism 130. In other embodiments, the light-transmitting prism 330 may have other shapes and/or arrangement method.

In another embodiment, the second optical module 340 may be positioned on the side of the first optical module 330 away from the light source 103. The galvanometer 340 may be positioned on the side of the light-transmitting prism 330 away from the light source 103, and may scan a strip-shaped scanning area. The scanning area may be different from the scanning area shown in FIG. 7.

Figure 8:
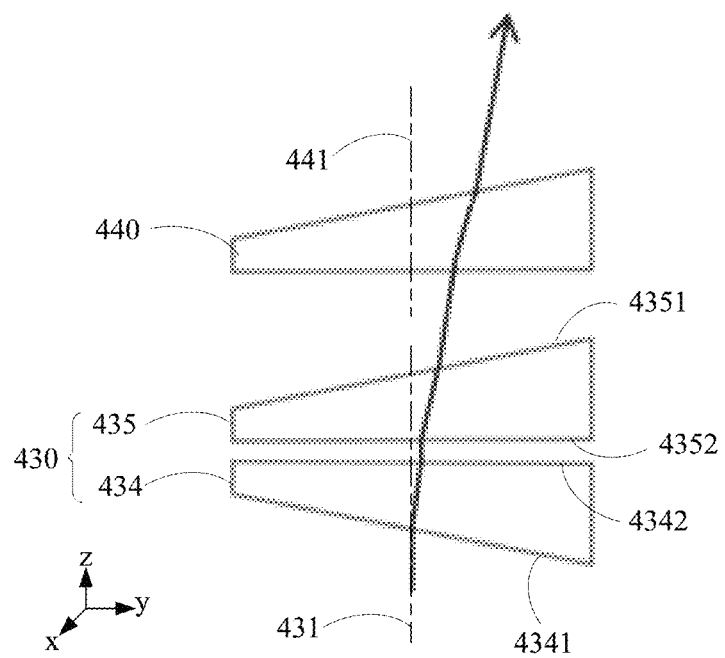
FIG. 8 is a schematic diagram illustrating the first optical module and the second optical module according to another embodiment of the present disclosure.

In other embodiments, the first optical module may include at least two light-transmitting prisms, and the at least two light-transmitting prisms may include a first light-transmitting prism and a second light-transmitting prism. FIG. 8 is a schematic diagram of a first optical module 430 and a second optical module 440. In the embodiment shown in FIG. 8, the first optical module 430 includes a first light-transmitting prism 434 and a second light-transmitting prism 435. The first light-transmitting prism 434 and the second light-transmitting prism 435 may rotate around the same rotation axis 431, or respectively rotate around two parallel rotation axes. The first light-transmitting prism 434 and the second light-transmitting prism 435 may rotate in opposite directions, the rotation speed difference may be less than a rotation speed threshold, and a substantially straight line. In one embodiment, the rotations speeds of the first light-transmitting prism 434 and the second light-transmitting prism 435 may be the same.

In some embodiments, at least one time during the rotation of the first light-transmitting prism 434 and the second light-transmitting prism 435, a mirror surface 4341 of the first light-transmitting prism 434 away from the second light-transmitting prism 435 and a mirror surface 4351 of the second light-transmitting prism 435 away from the first light-transmitting prism 434 may be symmetrical with respect to a plane perpendicular to the rotation axis 431 of the first light-transmitting prism 434 and the second light-transmitting prism 435. A mirror surface 4342 of the first light-transmitting prism 434 close to the second light-transmitting prism 435 and a mirror surface 4352 of the second light-transmitting prism 435 close to the first light-transmitting prism 434 may be symmetrical with respect to a plane perpendicular to the rotation axis 431.

The thickness of the first light-transmitting prism 434 may change in the radial direction, and the thickness of the second light-transmitting prism 435 may change in the radial direction. In the embodiment shown in FIG. 8, the mirror surfaces 4341 and 4342 of the first light-transmitting prism 434 and mirror surfaces 4351 and 4352 of the second light-transmitting prism 435 are both flat surfaces. The mirror surfaces 4341 and 4342 of the first light-transmitting prism 434 and mirror surfaces 4351 and 4352 of the second light-transmitting prism 435 may intersect the rotation axis 431. In one embodiment, the mirror surface 4341 of the first light-transmitting prism 434 and the mirror surface 4351 of the second light-transmitting prism 435 may be inclined to the rotation axis 431, and the mirror surface 4342 of the first light-transmitting prism 434 and the mirror surface 4352 of the second light-transmitting prism 435 may be perpendicular to the rotation axis 431. In other embodiments, the mirror surface 4341 of the first light-transmitting prism 434 and the mirror surface 4351 of the second light-transmitting prism 435 may be curved surfaces, and/or the mirror surface 4342 of the first light-transmitting prism 434 and the mirror surface 4352 of the second light-transmitting prism 435 may be curved surfaces.

Figure 9:
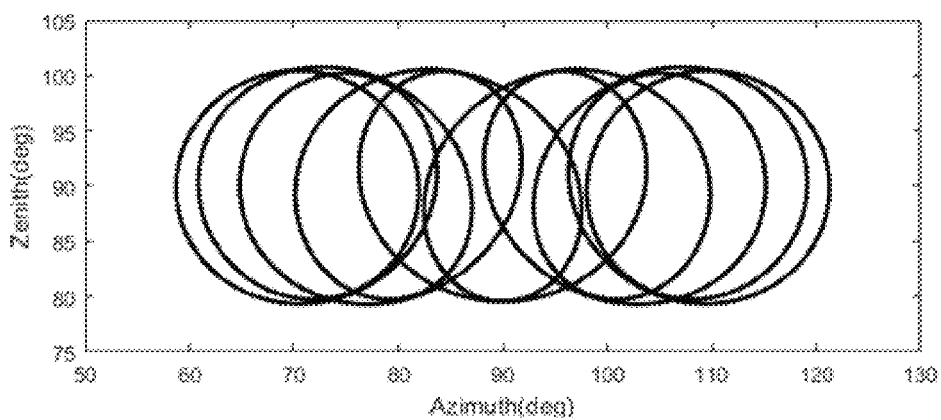
FIG. 9 is a schematic diagram of a scanning pattern scanned by the first optical module and the second optical module shown in FIG. 8.
Figure 10:
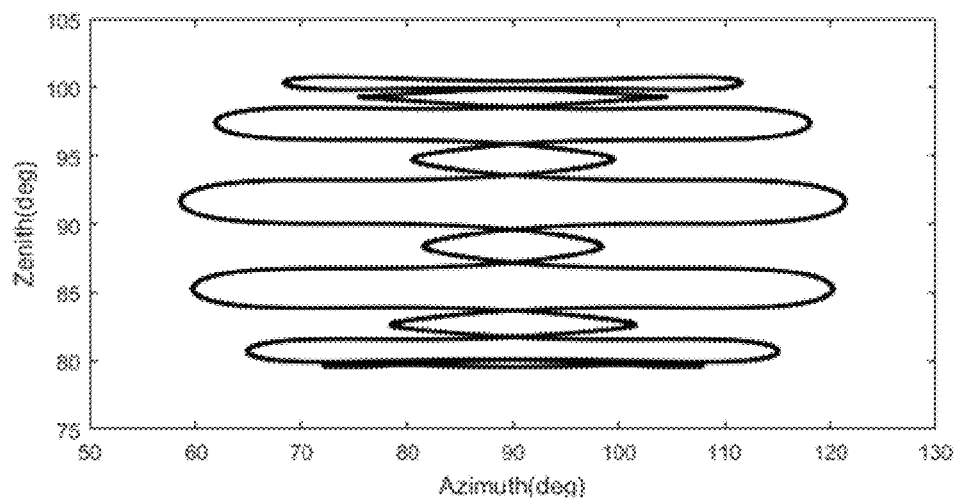
FIG. 10 is a schematic diagram of another scanning pattern scanned by the first optical module and the second optical module shown in FIG. 8.

The second optical module 440 may include at least one light-transmitting prism. In the embodiment shown in FIG. 8, the second optical module 440 is a light-transmitting prism rotating around a rotation axis 441. The rotation axis 441 of the light-transmitting prism of the second optical module 440, the rotation axis of the first light-transmitting prism 434, and the rotation axis of the second light-transmitting prism 435 may all be coaxial or parallel, or two of them may be coaxial and parallel to the other. The rotation speed of the light-transmitting prism 440 may be different from the rotation speed of the first light-transmitting prism 434 and the second light-transmitting prism 435. In the embodiment shown in FIG. 8, the second optical module 440 is positioned on the side of the first optical module 430 away from the light source 103. The first optical module 430 and the second optical module 440 may scan a long strip-shaped scanning range extending in multiple spirals. By adjusting the rotation speed of the first optical module 430 and/or the second optical module 440, patterns such as shown in FIG. 9 and FIG. 10 can be scanned.

When the prism rotation speed is limited, the first light-transmitting prism 434 and the second light-transmitting prism 435 may rotate in opposite directions at the same speed, and the scanned scan line may be along the horizontal direction. Moreover, the speed of the first light-transmitting prism 434 and the second light-transmitting prism 435 may be greater than the speed of the light-transmitting prism of the second optical module 440, and the point cloud scanned in this way may be mainly arranged in the horizontal direction, as shown in FIG. 9, which can be used in areas such as autonomous driving. Of course, when the rotation speed of the prims 434, 435, and 440 can reach very high speed, the point cloud can be very dense. The rotation speed of the prims 434, 435, and 440 may not be restricted by the rotation speed restriction condition when the prism rotation speed is limited.

In one embodiment, the wedge angles of the three light-transmitting prisms 434, 435, and 440 may be respectively $\alpha 1 \sim \alpha 3$, the refractive indexes may be respectively $n1 \sim n3$, and the rotation angles may be respectively $\theta 1 \sim \theta 3$. The rotation angle of the light-transmitting prism may be defined as the angle between the direction of the prism wedge angle and the x-axis. The parameters of the three light-transmitting prisms 434, 435, and 440 may be the same or different.

In one embodiment, the geometric dimensions and material refractive index of the first light-transmitting prism 434 and the second light-transmitting prism 435 may be the same, such as $\alpha 1 = \alpha 2$ and $n1 = n2$. When the first light-transmitting prism 434 and the second light-transmitting prism 435 rotate and satisfy the condition of θ1+θ2=2n π (n is an integer), after the light passes through the first light-transmitting prism 434 and the second light-transmitting prism 435, the exit direction may scan in the horizontal direction. The scanning range may be related to the wedge angle and refractive index of the first light-transmitting prism 434 and the second light-transmitting prism 435, which may be similar to $F_1=2(n_1-1)\alpha_1$.

After the light passes through the third light-transmitting prism 440, it may rotate around the incident direction. The deflection angle of the rotation may be related to the wedge angle and refractive index of the prism, and the deflection angle may be similar to $F_3=(n_3-1)\alpha_3$. After the light passes through the three prisms 434, 435, and 440, the exit direction may be equivalent to the superposition of the horizontal scanning and the circular scanning, such that a flat FOV may be formed. By controlling the refractive index and wedge angle parameters of the prisms, the FOC in two directions may be flexibly adjusted. The horizontal and vertical FOV ranges may be respectively similar to:

$$FOV_H=F_1+F_3=2(n_1-1)\alpha_1+(n_3-1)\alpha_3$$

$$FOV_V=F_3=(n_3-1)\alpha_3$$

The shape and arrangement of the light-transmitting prism of the second optical module shown in FIG. 8 are similar to the light-transmitting prism of the first optical module 130 shown in FIG. 2. In other embodiments, the light-transmitting prism of the second optical module 440 may have other shapes and/or arrangement methods. In one embodiment, the second optical module 440 may be positioned on the side of the first optical module 430 close to the light source 103. The first light-transmitting prism 434 and the second light-transmitting prism 435 may be positioned on the side of the light-transmitting prism 440 away from the light source 103.

In other embodiments, the first light-transmitting prism 434 and the second light-transmitting prism 435 may rotate at different speeds to scan the strip-shaped scanning range, which may be different from the scanning range of the first optical module 430 and the second optical module 440 shown in FIG. 8.

Figure 11:
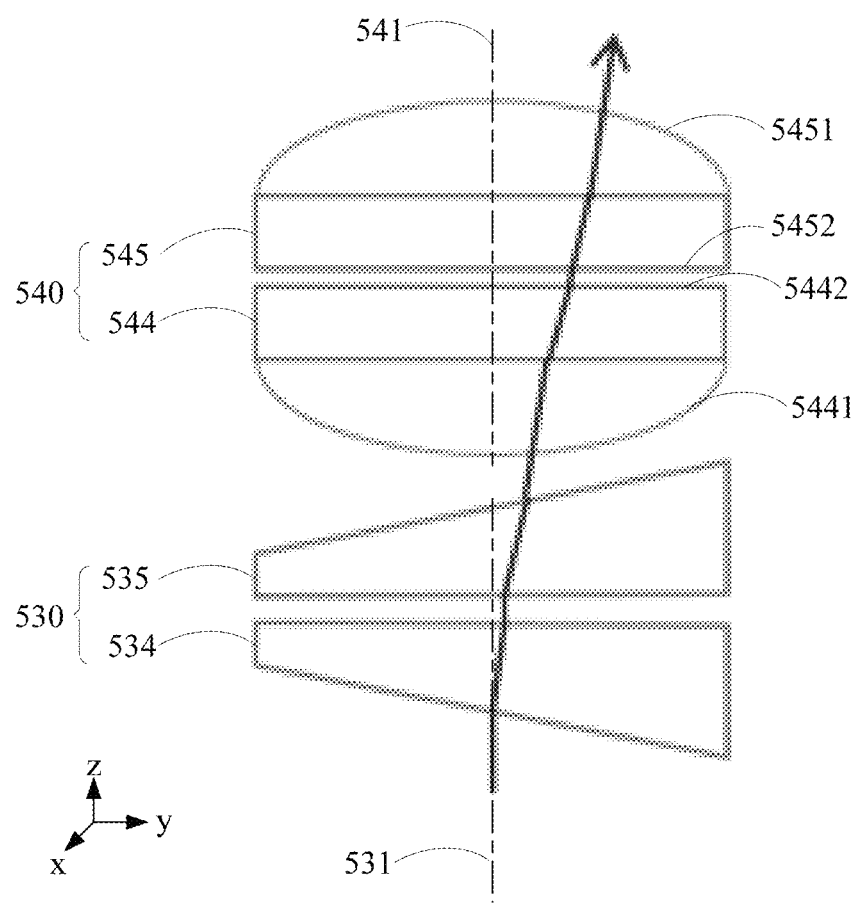
FIG. 11 is a schematic diagram illustrating the first optical module and the second optical module according to another embodiment of the present disclosure.

FIG. 11 is a schematic diagram of a first optical module 530 and a second optical module 540 according to another embodiment of the present disclosure. The first optical module 530 may include a first light-transmitting prism 534 and a second light-transmitting prism 535. The first optical module 530 may be similar to the first optical module 430 shown in FIG. 8, which will not be repeated here. Compared with the embodiment shown in FIG. 8, the second optical module 540 of the embodiment shown in FIG. 11 includes at least two light-transmitting prisms, and the at least two light-transmitting prisms includes a third light-transmitting prism 544 and a fourth light-transmitting prism 545.

Figure 12:
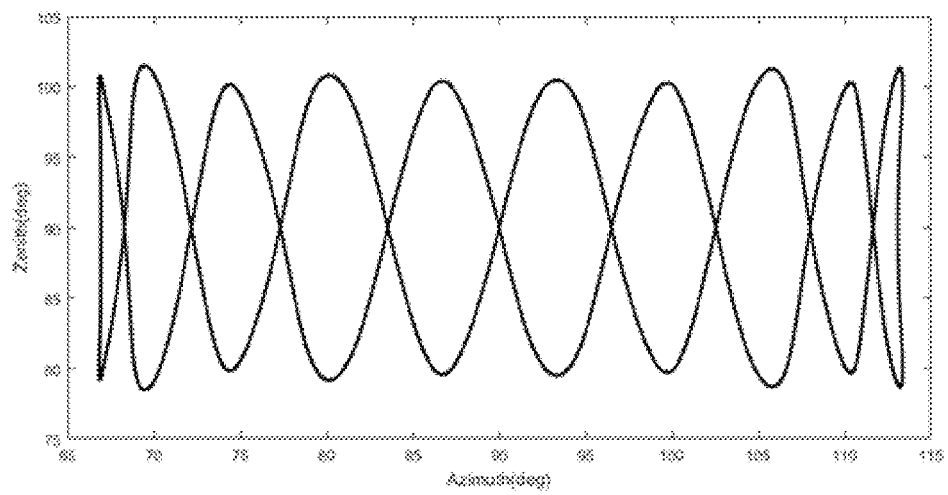
FIG. 12 is a schematic diagram of a scanning pattern scanned by the first optical module and the second optical module shown in FIG. 11.
Figure 13:
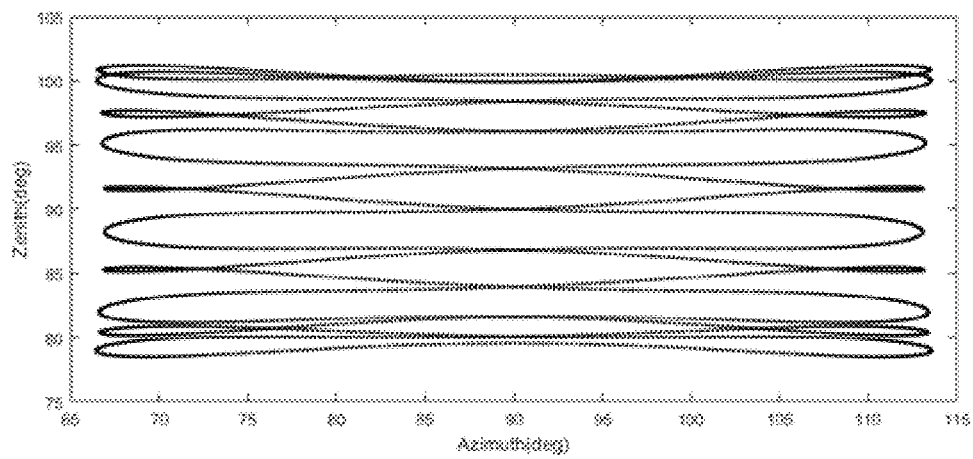
FIG. 13 is a schematic diagram of another scanning pattern scanned by the first optical module and the second optical module shown in FIG. 11.

In the embodiment shown in FIG. 11, the third light-transmitting prism 544 and the fourth light-transmitting prism 545 can rotate around the same rotation axis 541, or rotate around two parallel rotation axes. The rotation axes of the third light-transmitting prism 544, the fourth light-transmitting prism 545, the first light-transmitting prism 534, and the second light-transmitting prism 535 may all be coaxial or parallel, or at least two of them may be coaxial and parallel to the other rotation axis. The third light-transmitting prism 544 and the fourth light-transmitting prism 545 may rotate in opposite directions, and the rotation speed difference may be less than the rotation speed threshold. In one embodiment, the rotation speeds of the third light-transmitting prism 544 and the fourth light-transmitting prism 545 may be the same. The third light-transmitting prism 544 may be close to the first optical module 530 and configured to receive the light emitted from the second light-transmitting prism 535 of the first optical module 530. The fourth light-transmitting prism 545 may be configured to receive the emitted light of the third light-transmitting prism 544. The first optical module 530 shown in FIG. 11 may scan substantially a straight line. When the direction of the incident light incident on the second optical module 540 does not change, the second optical module 540 may scan substantially a straight line and intersect the straight line scanned by the first optical module 530. When the first optical module 530 and the second optical module 540 are combined, the scanning range of a rectangular or other parallelogram may be scanned, such that scanning patterns shown in FIG. 11 and FIG. 12 may be scanned.

Similar to the first light-transmitting prism 534 and the second light-transmitting prism 535, the thickness of the third light-transmitting prism 544 may change along the radial direction, and the thickness of the fourth light-transmitting prism 545 may change along the radial direction. In some embodiments, at least one time during the rotation of the third light-transmitting prism 544 and the fourth light-transmitting prism 545, a mirror surface 5441 of the third light-transmitting prism 544 away from the fourth light-transmitting prism 545 and a mirror surface 5451 of the fourth light-transmitting prism 545 away from the third light-transmitting prism 544 may be symmetrical with respect to a plane perpendicular to the rotation axis 541 of the third light-transmitting prism 544 and the fourth light-transmitting prism 545. A mirror surface 5442 of the third light-transmitting prism 544 close to the fourth light-transmitting prism 545 and a mirror surface 5452 of the fourth light-transmitting prism 545 close to the third light-transmitting prism 544 may be symmetrical with respect to a plane perpendicular to the rotation axis 541 of the third light-transmitting prism 544 and the fourth light-transmitting prism 545.

The mirror surface 5441 of the third light-transmitting prism 544 and the mirror surface 5451 of the fourth light-transmitting prism 545 may be flat or curved, and the mirror surface 5442 of the third light-transmitting prism 544 and the mirror surface 5452 of the fourth light-transmitting prism 545 may be flat or curved. In the embodiment shown in FIG. 11, the mirror surface 5441 of the third light-transmitting prism 544 and the mirror surface 5451 of the fourth light-transmitting prism 545 are both curved, and the mirror surface 5442 of the third light-transmitting prism 544 and the mirror surface 5452 of the fourth light-transmitting prism 545 are both flat. In another embodiment, the third light-transmitting prism 544 and the fourth light-transmitting prism 545 may be similar to the first light-transmitting prism 534 and the second light-transmitting prism 535. In other embodiment, the rotation speeds of the third light-transmitting prism 544 and the fourth light-transmitting prism 545 may be different from the rotation speeds of the first light-transmitting prism 534 and the second light-transmitting prism 535.

The wedge angles of the four prisms 534, 535, 544, and 545 may be respectively $\alpha1\sim\alpha4$, the refractive indexes may be respectively $n1\sim n4$, and the rotation angles may be respectively $\theta1\sim\theta4$. The rotation angle of the prism may be defined as the angle between the direction of the prism wedge angle and the x-axis. The parameters of the four prisms 534, 535, 544, and 545 may be the same or different.

In one embodiment, the geometric dimensions and material refractive indexes of the first light-transmitting prism 534 and the second light-transmitting prism 535 may be the same, and the geometric dimensions and material refractive indexes of the third light-transmitting prism 544 and the fourth light-transmitting prism 545 may be the same. As such, $\alpha1=\alpha2$, $\alpha3=\alpha4$, $n1=n2$, and $n3=n4$.

When the first light-transmitting prism 534 and the second light-transmitting prism 535 rotate and satisfy the condition of $\theta1+\theta2=2n\pi$ (n is an integer), after the light passes through the first light-transmitting prism 534 and the second light-transmitting prism 535, the exit direction may scan in the horizontal direction. The scanning range (i.e., the horizontal direction FOV) may be related to the wedge angle and refractive index of the first light-transmitting prism 534 and the second light-transmitting prism 535, which may be similar to $FOV_H=2(n_1-1)\alpha_1$.

When the third light-transmitting prism 544 and the fourth light-transmitting prism 545 rotate and satisfy the condition of $\theta3+\theta4=2(n+1)\pi$ (n is an integer), the light may scan the vertical direction after passing through the third light-transmitting prism 544 and the fourth light-transmitting prism 545. The scanning range may be similar to $FOV_v=2(n_2-1)\alpha_1$.

Therefore, by designing the wedge angle and refractive index of the prism, the horizontal and vertical FOV may be designed flexibly.

In other embodiments, the third light-transmitting prism 544 and the fourth light-transmitting prism 545 may rotate at different speeds and scan the scanning range different from the scanning range of the first optical module 530 and the second optical module 540 shown in FIG. 11. In other embodiments, the second optical module 540 may include three or more light-transmitting prisms. In other embodiments, the rotation speeds of the first light-transmitting prism 534 and the second light-transmitting prism 535 may be different.

Figure 14:
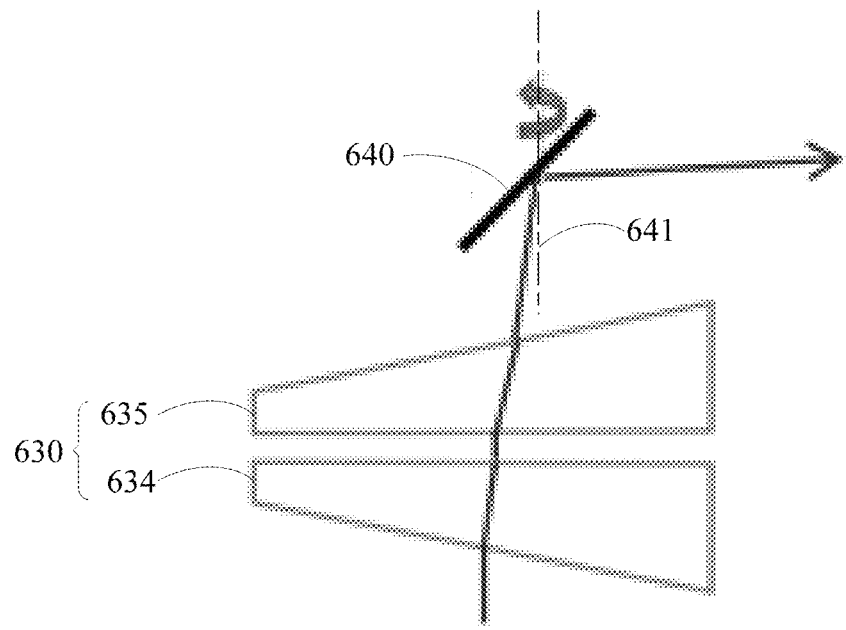
FIG. 14 is a schematic diagram illustrating the first optical module and the second optical module according to another embodiment of the present disclosure.

FIG. 14 is a schematic diagram of a first optical module 630 and a second optical module 640 according to another embodiment of the present disclosure. The first optical module 630 may include a first light-transmitting prism 634 and a second light-transmitting prism 635. The shape and arrangement method of the first optical module 630 may be similar to the shape and arrangement method of the first optical modules 430 and 530 shown in FIG. 8 and FIG. 11, and will not be repeated here.

In the embodiment shown in FIG. 14, the second optical module 640 includes a reflective element. In this embodiment, the reflective element 640 is a reflective mirror. The reflective mirror 640 shown in FIG. 14 may be similar to the reflective mirror 140 shown in FIG. 2, in which the reflective mirror 640 may face the first optical module 630 and rotate around the rotation axis 641. For detailed description, reference may be made to the corresponding description in FIG. 2, which will not be repeated here. In another embodiment, the reflective mirror 640 may be a reflective prism. In the embodiment shown in FIG. 14, the reflective element 640 is positioned on the side of the first optical module 630 away from the light source 103 and reflects the light emitted by the second light-transmitting prism 635 of the first optical module 630. In another embodiment, the reflective element 640 may be positioned on the side of the first optical module 630 close to the light source 103.

In the embodiment shown in FIG. 14, the rotation speed of one of the first light-transmitting prism 634 and the second light-transmitting prism 635 may be equal to the rotation speed of the reflective element 640 plus a set rotation speed, and the rotation speed of the other may be equal to the rotation speed of the reflective element 640 minus the set rotation speed. In one example, the rotation speed of the reflective element 640 may be a, the set rotation speed may be w, the rotation speed of the second light-transmitting prism 635 may be a-w, and the rotation speed of the second light-transmitting prism 635 may be a+w. In another example, the rotation speed of the second light-transmitting prism 635 may be a+w, and the rotation speed of the second light-transmitting prism 635 may be a-w. In one embodiment, the reflective element 640 may rotate 360° and scan the scanning range of a circular strip. In another embodiment, the reflective element 640 may rotate repeatedly within an angle range less than 360° or perform a 360° rotation through a polygon mirror to scan an arc-shaped strip scanning range of a certain angle range. In yet another embodiment, the reflective element 640 may vibrate and scan a rectangular strip scanning range.

Figure 15:
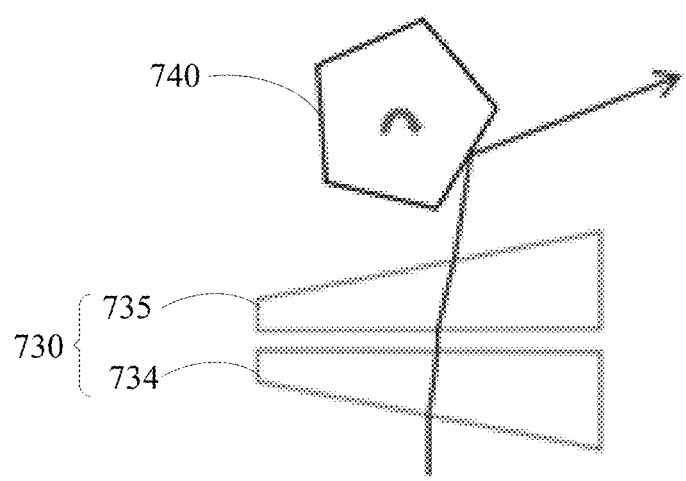
FIG. 15 is a schematic diagram illustrating the first optical module and the second optical module according to another embodiment of the present disclosure.

FIG. 15 is a schematic diagram illustrating a first optical module 730 and a second optical 740 module according to another embodiment of the present disclosure. The first optical module 730 may include a first light-transmitting prism 734 and a second light-transmitting prism 735. The first optical module 730 may be similar to the first optical modules 430 and 530 shown in FIG. 8 and FIG. 11. The rotation speed difference between the first light-transmitting prism 734 and the second light-transmitting prism 735 may be smaller than the rotation speed threshold and the rotation direction may be opposite. In one embodiment, the rotation speeds of the first light-transmitting prism 734 and the second light-transmitting prism 735 may be the same. The second optical module 740 may include a reflective element. In the embodiment shown in FIG. 15, the reflective element 740 is a polygon mirror, similar to the polygon mirror shown in FIG. 5, and combined with the first optical module 730, it can scan an arc-shape strip scanning range. The polygon mirror may be a prism, for detailed description, reference may be made to the above embodiment.

In the embodiment shown in FIG. 15, the polygon mirror 740 is positioned on the side of the first optical module 730 away from the light source 103.

Figure 16:
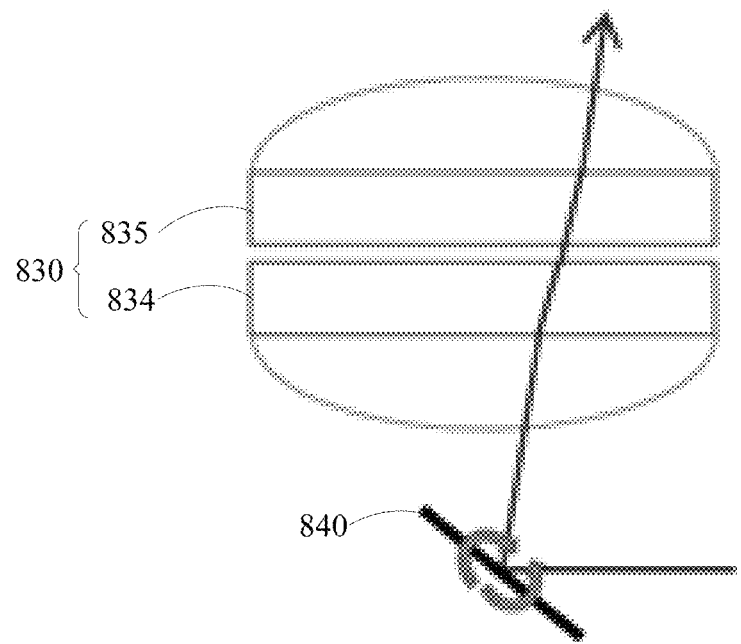
FIG. 16 is a schematic diagram illustrating the first optical module and the second optical module according to another embodiment of the present disclosure.

FIG. 16 is a schematic diagram illustrating a first optical module 830 and a second optical module 840 according to another embodiment of the present disclosure. The first optical module 830 may include a first light-transmitting prism 834 and a second light-transmitting prism 835. The first light-transmitting prism 834 and the second light-transmitting prism 835 shown in FIG. 16 may be similar to the third light-transmitting prism 544 and the fourth light-transmitting prism 545 shown in FIG. 11. In other embodiments, the first light-transmitting prism 834 and the second light-transmitting prism 835 may be similar to the first light-transmitting prisms 434, 534, 634, and 734, and the second light-transmitting prisms 435, 535, 635, and 735 shown in FIGS. 8, 11, 14, and 15, respectively.

The first optical module 830 may be positioned on the side of the second optical module 840 away from the light source 103. The second optical module 840 may include a reflective element. In the embodiment shown in FIG. 16, the reflective element 840 is a galvanometer, similar to the galvanometer 340 shown in FIG. 6. The galvanometer 840 can reflect the light beam emitted by the light source 103, and the light beam reflected by the galvanometer 840 may sequentially pass through the first light-transmitting prism 834 and the second light-transmitting prism 835, and scan a rectangular scanning range.

In another embodiment, the galvanometer 840 may be positioned on the side of the first optical module 830 away from the light source 103. The light beam emitted by the light source 103 may sequentially pass through the first light-transmitting prism 834 and the second light-transmitting prism 835, project to the galvanometer 840, and reflected by the galvanometer 840.

In some embodiments, the first optical module may include a reflective element, and the second optical module may include a reflective element. In some embodiments, the first optical module may include a galvanometer, and the second optical module may include at least one of a reflective mirror, a reflective prism, and a polygon mirror.

Figure 17:
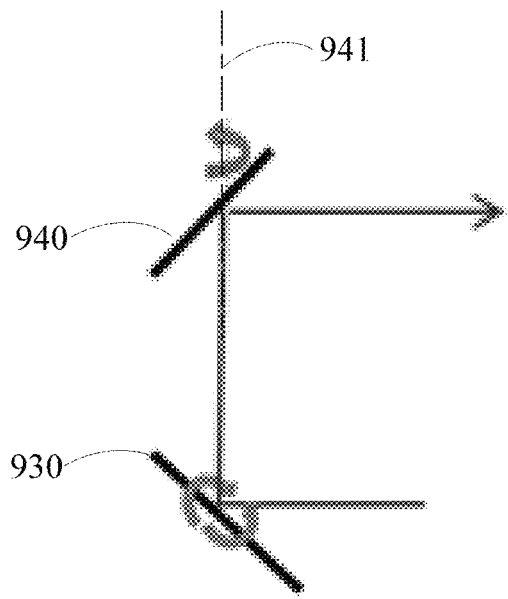
FIG. 17 is a schematic diagram illustrating the first optical module and the second optical module according to another embodiment of the present disclosure.

FIG. 17 is a schematic diagram illustrating a first optical module 930 and a second optical module 940 according to another embodiment of the present disclosure. In the embodiment shown in FIG. 17, the first optical module 930 is a galvanometer, and the second optical module 940 is a reflective mirror. The galvanometer 930 may be positioned on the side of the reflective mirror 940 close to the light source 103. When the reflective mirror 940 rotates 360° around the rotation axis 941, in combination with the galvanometer 930, a circular strip-shaped scanning range may be scanned. When the reflective mirror rotates repeatedly within an angle range less than 360°, it may scan a certain angle range of an arc-shaped strip scanning range. When the reflective mirror vibrates, a rectangular strip-shaped scanning range may be scanned. In another embodiment, the galvanometer 930 may be positioned on the side of the reflective mirror 940 away from the light source 103. In another embodiment, the/640 may be a reflective prism.

Figure 18:
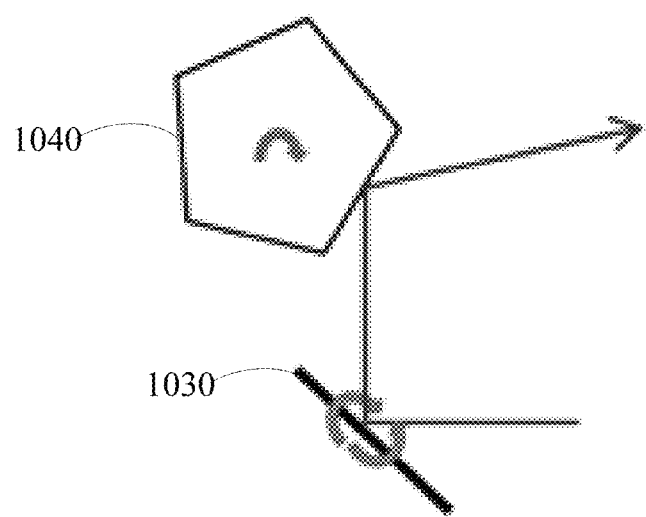
FIG. 18 is a schematic diagram illustrating the first optical module and the second optical module according to another embodiment of the present disclosure.

FIG. 18 is a schematic diagram illustrating a first optical module 1030 and a second optical module 1040 according to another embodiment of the present disclosure. The embodiment shown in FIG. 18 is similar to the embodiment shown in FIG. 17, and the first optical module 1030 is a galvanometer. Compared with the embodiment shown in FIG. 17, in the embodiment shown in FIG. 18, the second optical module 1040 is a polygon mirror. The polygon mirror 1040 may be positioned on the side of the galvanometer 1030 away from the light source 103. The polygon mirror 1040 may reflect the light beam reflected by the galvanometer 1030, and scan an arc-shaped strip scanning range. In another embodiment, the polygon mirror 1040 may be positioned on the side of the galvanometer 1030 close to the light source 103.

In some other embodiments, the first optical module 1030 and the second optical module 1040 may be one or a combination of two or more of a galvanometer, reflective mirror, reflective prism, and polygon mirror.

Figure 19:
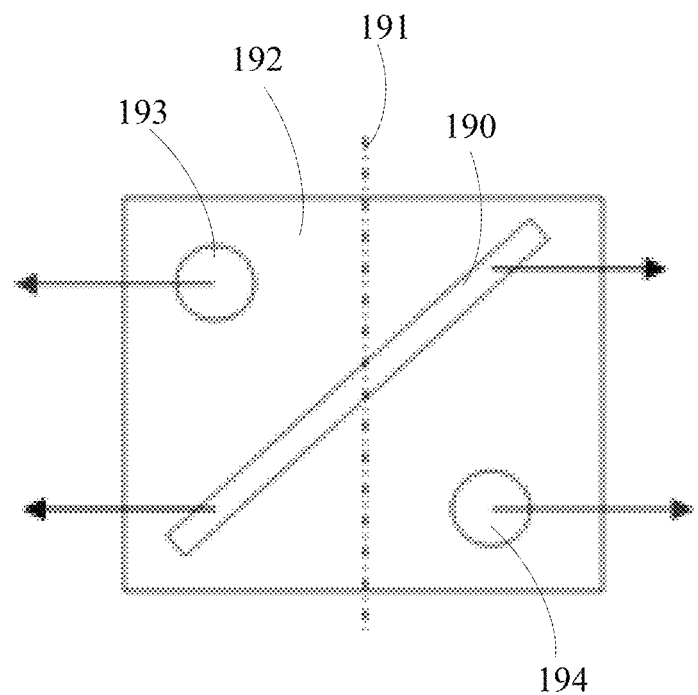
FIG. 19 is a schematic diagram of a reflective element according to an embodiment of the present disclosure.

FIG. 19 is a schematic diagram of a reflective element 190 according to an embodiment of the present disclosure. The reflective element 190 may include a reflective mirror or a reflective prism. The reflective surface of the reflective element 190 may extend obliquely with respect to a rotation axis 191 of the reflective element 190. The reflective element 190 may be fixed on a rotating body 192, and the rotating body 192 may be used to balance the dynamic balance of the reflective element 190, such that the reflective element 190 may maintain balance when rotating at a high speed.

In one embodiment, the rotating body 192 may supplement the mass at places where the quality is defective. For example, counterweights 193 and 194 whose densities are higher than the density of the rotating body 192 may be added, such that the rotating body 192 and the reflective element 190 can be balanced. In the embodiment shown in FIG. 19, the reflective element 190 is a reflective mirror. The reflective element 190 extends obliquely from the upper right to the lower left of the rotating body 192, the lower right of the rotating body 192 includes a counterweight 194, and the upper left includes a counterweight 193 to achieve dynamic balance. The reflective element 190 may be used in the embodiments described in FIG. 2, FIG. 14, and FIG. 17.

It should be noted that the relationship terms used in the text of this application, such as first and second, are only for distinguishing an object or operation from another object or operation, but not for defining or implying any practical relation or order between the object or operation. The terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . ." shall not obviate that in addition to containing the said essential element in the process, method, object or equipment, other essential element of the same nature may also exist in the above-mentioned process, method, object or equipment.

The method and apparatus provided in embodiments of the present disclosure have been described in detail above. In the present disclosure, particular examples are used to explain the principle and embodiments of the present disclosure, and the above description of embodiments is merely intended to facilitate understanding the methods in the embodiments of the disclosure and concept thereof, meanwhile, it is apparent to persons skilled in the art that changes can be made to the particular implementation and application scope of the present disclosure based on the concept of the embodiments of the disclosure, in view of the above, the contents of the specification shall not be considered as a limitation to the present disclosure.

What is claimed is:

1. A distance detection device, comprising:
a light source configured to emit pulse light beams sequentially; and
a scanning module including a first optical module, a second optical module, and drivers, the first optical module and the second optical module being sequentially positioned on an optical path of the light beams emitted by the light source, the drivers being configured to drive the first optical module and the second optical module to move to sequentially project the light beams emitted by the light source to different directions;
wherein:
the first optical module includes a light-transmitting prism, and the second optical module includes a polygon mirror, the polygon mirror having a plurality of reflective surfaces configured to alternately reflect one or more light beams emitted by the light-transmitting prism; or
the first optical module includes at least two light-transmitting prisms sequentially positioned on the optical path, and the second optical module includes a light-transmitting prism.

2. The distance detection device of claim 1, wherein:
the first optical module is configured to change a fixed light beam to emit to different directions at different times to form a field of view close to a cone and the second optical module is configured to change a direction of the fixed light beam to offset along a line; or, the first optical module is configured to change the direction of the fixed light beam to offset along a line, and the second optical module is configured to change the fixed light beam to different directions at different times to form a field of view close to a cone.

3. The distance detection device of claim 1, wherein:
the first optical module includes a light-transmitting prism, and the second optical module includes the polygon mirror; and
the light-transmitting prism and the polygon mirror rotate around a same rotation axis, or about two parallel rotation axes, or two rotation axes with a certain included angle.

4. The distance detection device of claim 1, wherein:
the first optical module includes at least two light-transmitting prisms, and the at least two light-transmitting prisms include a first light-transmitting prism and a second light-transmitting prism.

5. The distance detection device of claim 4, wherein:
the first light-transmitting prism and the second light-transmitting prism rotate around the same rotation axis at a same speed and opposite directions.

6. The distance detection device of claim 5, wherein:
at least at a time in the rotation of the first light-transmitting prism and the second light-transmitting prism, a surface of the first light-transmitting prism away from the second light-transmitting prism and a surface of the second light-transmitting prism away from the first light-transmitting prism are mirror-symmetrical, a symmetry plane between the surface of the first light-transmitting prism away from the second light-transmitting prism and the surface of the second light-transmitting prism away from the first light-transmitting prism is perpendicular to the rotation axis of the first light-transmitting prism and the second light-transmitting prism, and a surface of the first light-transmitting prism close to the second light-transmitting prism and a surface of the second light-transmitting prism close to the first light-transmitting prism are mirror-symmetrical with respect to the symmetry plane.

7. The distance detection device of claim 4, wherein:
the second optical module includes at least two light-transmitting prisms, and the at least two light-transmitting prisms include a third light-transmitting prism and a fourth light-transmitting prism.

8. The distance detection device of claim 7, wherein:
the third light-transmitting prism and the fourth light-transmitting prism rotate around a same rotation axis at a same speed and opposite directions.

9. The distance detection device of claim 8, wherein:
rotation speeds of the third light-transmitting prism and the fourth light-transmitting prism are different from the rotation speeds of the first light-transmitting prism and the fourth light-transmitting prism.

10. The distance detection device of claim 7, wherein:
the third light-transmitting prism and the fourth light-transmitting prism rotate at different speeds.

11. The distance detection device of claim 5, wherein:
the second optical module further includes a reflective element.

12. The distance detection device of claim 4, wherein:
the first light-transmitting prism and the second light-transmitting prism rotate at different speeds.

13. The distance detection device of claim 12, wherein:
the second optical module further includes a reflective element, and the reflective element includes a reflective mirror or a reflective prism.

14. The distance detection device of claim 13, wherein:
the rotation speed of one of the first light-transmitting prism and the second light-transmitting prism is equal to the rotations of the reflective element plus a set rotation speed; and the rotation speed of the other is equal to the rotation speed of the reflective element minus the set speed.

15. The distance detection device of claim 1, wherein:
the second optical module further includes a reflective element.

16. The distance detection device of claim 15, wherein:
the reflective element includes a reflective mirror or a reflective prism, the reflective element including a reflective surface for reflecting the light beam, the reflective surface being inclined with respect to the rotation axis of the reflective element and facing the first optical module.

17. The distance detection device of claim 16, wherein:
a rotation axis of the reflective element is parallel to the rotation axis of the first optical module.

18. The distance detection device of claim 1, wherein the first optical module includes a light-transmitting prism, and the second optical module includes the polygon mirror, the polygon mirror having the plurality of reflective surfaces configured to alternately reflect the one or more light beams emitted by the light-transmitting prism.

19. The distance detection device of claim 1, wherein the first optical module includes at least two light-transmitting prisms, and the second optical module includes a light-transmitting prism.

20. The distance detection device of claim 19, wherein the first optical module includes a first light-transmitting prism and a second light-transmitting prism, the second optical module includes a third light-transmitting prism and a fourth light-transmitting prism, each of the first light transmitting prism and the second light transmitting prism having two flat mirror surfaces opposite to each other, and each of the third light-transmitting prism and the fourth light-transmitting prism having a flat surface and a curved surface opposite to each other.

* * * * *